Feb. 18, 1969  P. C. FEFFER ET AL  3,427,737
FRONT EDGE PRESSING MACHINE
Filed Nov. 30, 1966  Sheet 1 of 4

INVENTORS
PHILIP C. FEFFER
AMLETO C. POLINO
BY ARTHUR L. RICKELL
KARL W. FLOCKS
ATTORNEY

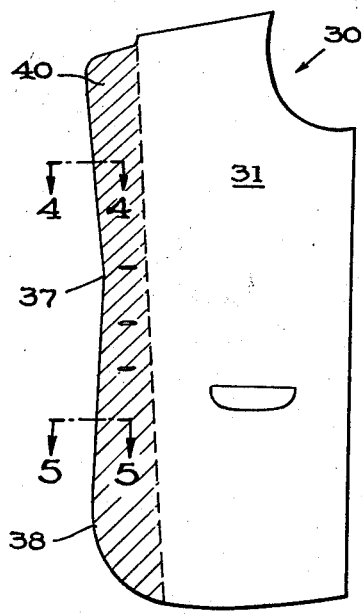
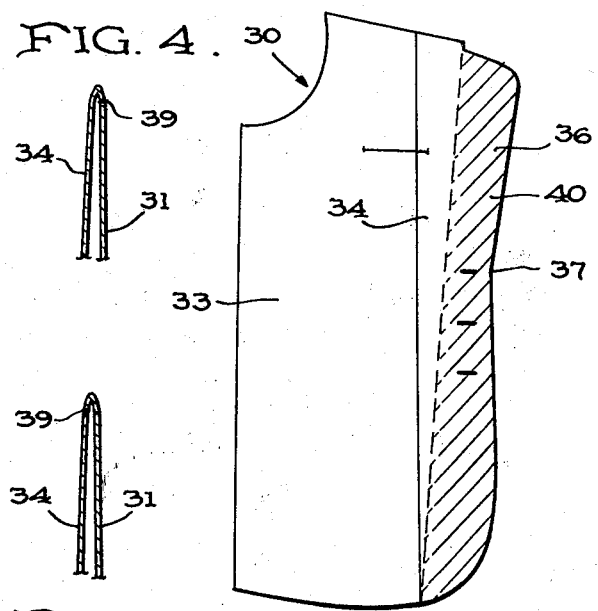
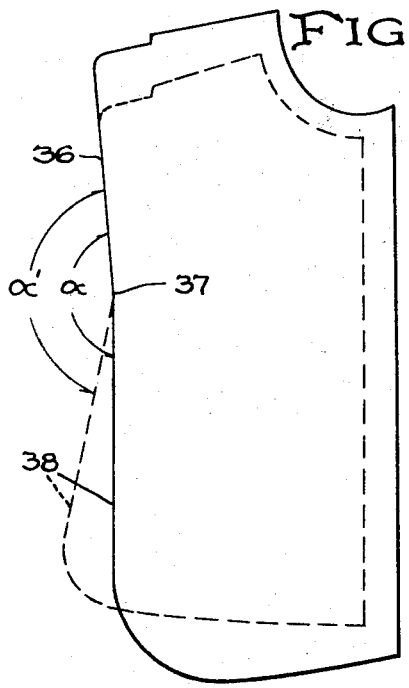
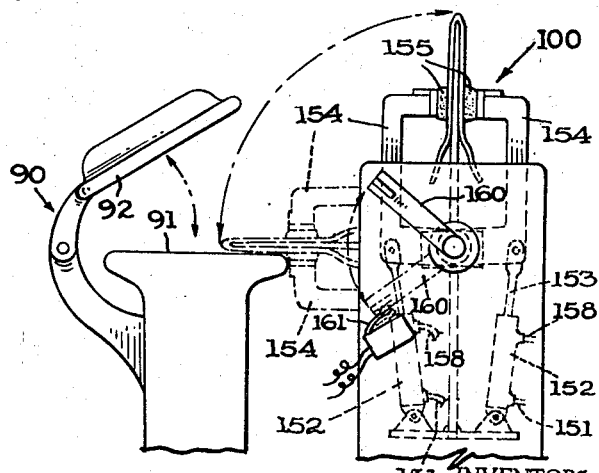

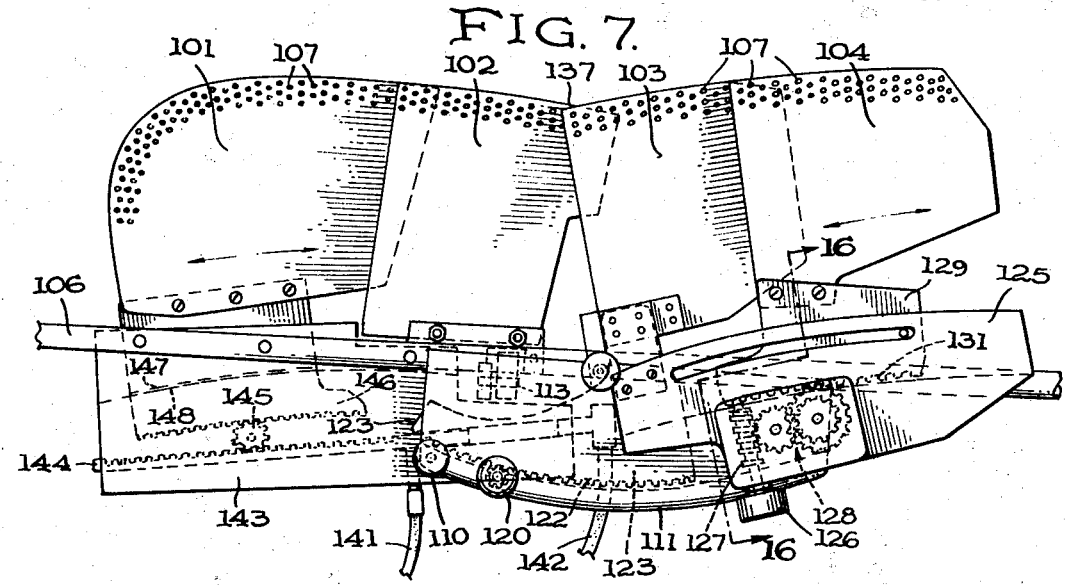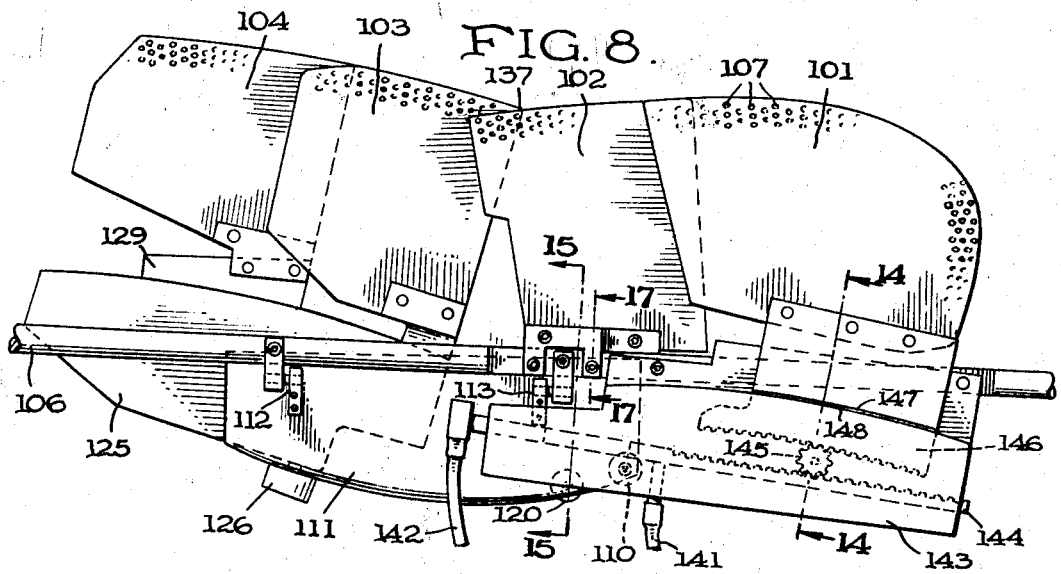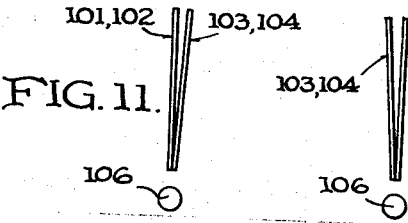

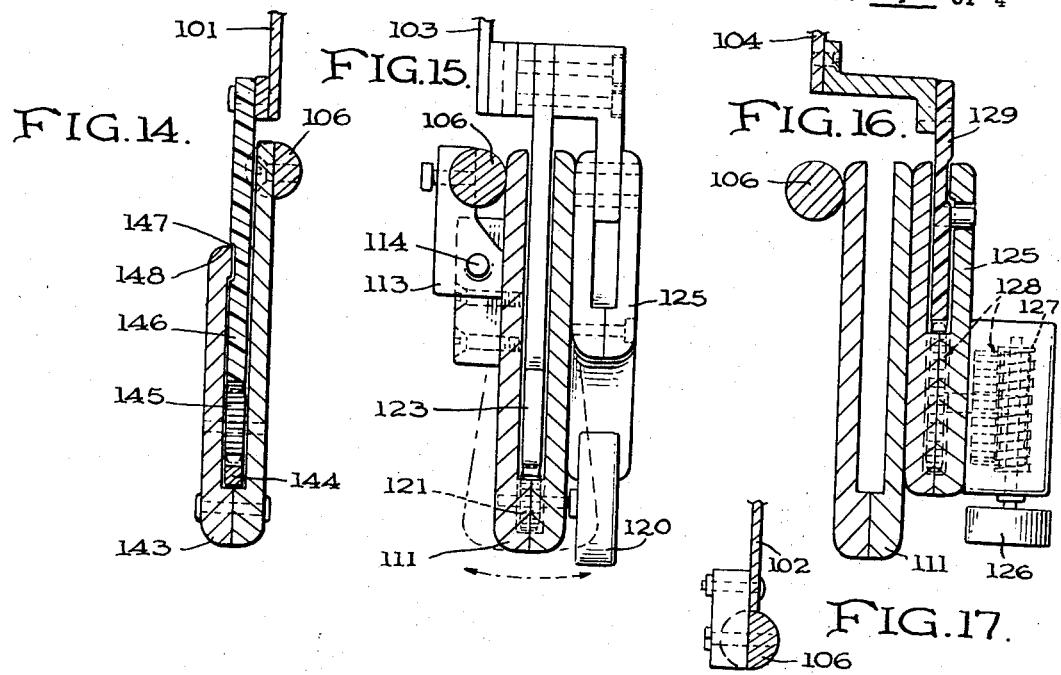
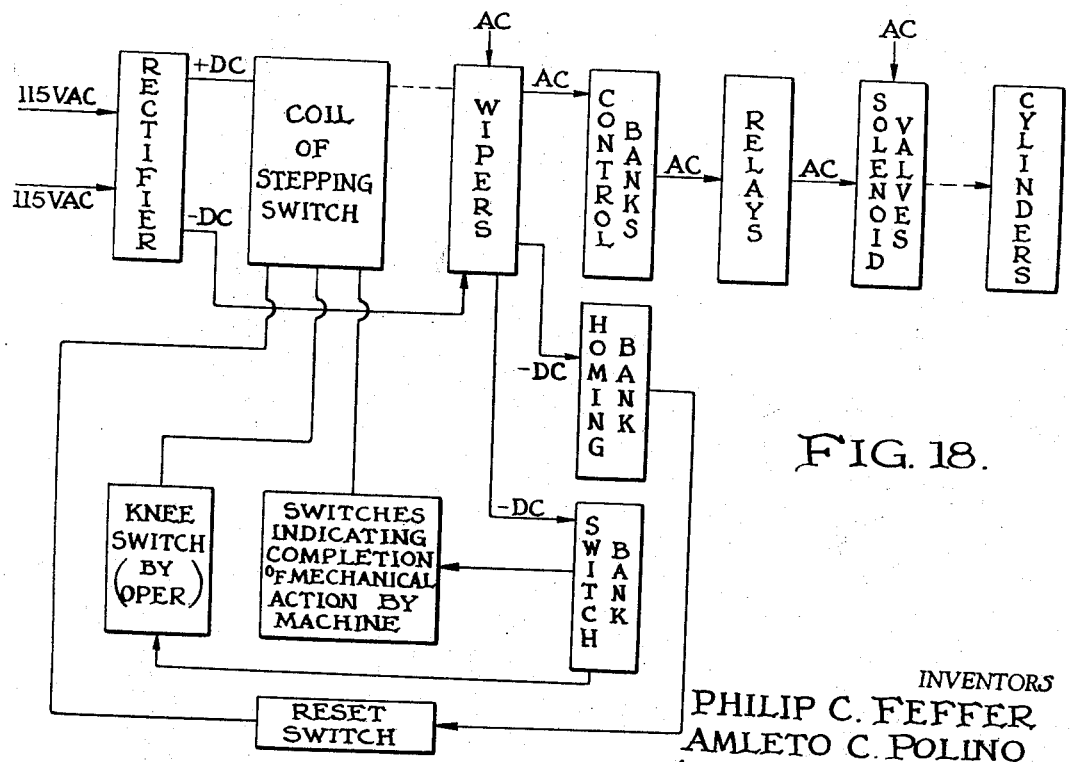

United States Patent Office 3,427,737
Patented Feb. 18, 1969

3,427,737
FRONT EDGE PRESSING MACHINE
Philip C. Feffer, Baltimore, and Amleto C. Polino and Arthur L. Rickell, Frederick, Md., assignors to Sagner, Inc., Frederick, Md., a corporation of Maryland
Filed Nov. 30, 1966, Ser. No. 598,057
U.S. Cl. 38—20        12 Claims
Int. Cl. D06f 71/00

ABSTRACT OF THE DISCLOSURE

In the process of manufacturing a coat, a method of pressing a coat front along the seam while the coat front is held on a form which may be adjustable for different sizes and different styles; and an embodiment of apparatus which may be used to implement the method. The apparatus comprises a plurality of plates with thin edge portions slidingly and pivotally movable in relation to each other.

---

The present invention relates to a machine for pressing clothing material and has particular reference to an improved method and means to shape and press the edge of a coat front including the lapel to the bottom of the coat.

Presently in the manufacture of a coat by a prior art method, in the forming of the edge of the coat front, the front, facing and interlining are joined at the seam, turned inside out after which the piece is basted along the edge so as to hold the material folded adjacent to the seam. With this basting along the edge, the coat front is placed in a pressing machine and usually steam pressed in order to form the edge alongside the seam. The basting is then removed and the manufacture of the coat is continued to completion.

Accordingly, the present invention is directed to the apparatus and method of forming this coat front and allowing the elimination of the basting along the seam followed by the necessary removal of the threads. Such elimination of steps in the process of manufacture of the coat of course reduces the costs of the necessary operations.

With the present invention it is possible to provide the same press of the edge of the coat front with the accuracy necessary for good tailoring without the use of the steps of basting close to the edge and removal of the threads after pressing.

Therefore, the elimination of edge basting and the elimination of loss due to damage from stretching and handling during basting greatly increases the quality of the goods manufactured by the process of this invention. In addition, because of the perfect shape of the metal form, the quality of the finished coat should be better than the coat produced by the prior basting method.

A further advantage of the present invention lies in the form of the apparatus which allows accurate pressing along the edge of the coat front with adjustment of the machine to compensate for changes of size and style and which allows numerous changes in shape of the edge with all coat fronts accommodated in the single machine.

Basically the present invention provides a novel method by which the edges of a coat front are formed and in addition provides a form of apparatus comprising a sheet metal form adjustable to fit a large variety of styles of coat and suit jacket fronts and a complete range of sizes within the style with the sheet metal portions movably mounted in relation to each other and made so as to fit within a coat front and expand to fit the coat front in combination with a pressing machine which will press and form the edge of the coat front.

The above and other objects and advantages of the invention will become apparent upon full consideration of the following detailed description and accompanying drawings in which:

FIGS. 2 and 3 show outside and inside views respectively of a left coat front which can be formed in a machine such as that shown in FIG. 1 by the method of the present invention;

FIG. 4 is a partial section view along the line 4—4 in FIG. 2;

FIG. 5 is a partial section view along line 5—5 of FIG. 2;

FIG. 6 shows possible variations in coat front shape;

FIG. 7 is a front elevation of the plates and mechanism for operating the plates shown in the machine in FIG. 1 with the plates adjusted differently from that shown in FIG. 1;

FIG. 8 is a rear elevation of the portion of the machine shown in FIG. 7;

FIG. 10 is a diagrammatic top plan view of the plates of the machine;

FIGS. 11 and 12 are diagrammatic showings of the plates selectively offset for pressing left and right coat fronts, respectively;

FIG. 13 is a side elevational view showing positions of operation of the machine of FIG. 1;

FIG. 14 is a cross sectional view along lines 14—14 in FIG. 8;

FIG. 15 is a cross sectional view along lines 15—15 in FIG. 8;

FIG. 16 is a cross sectional view along lines 16—16 in FIG. 7;

FIG. 17 is a cross sectional view along lines 17—17 in FIG. 8; and

FIG. 18 is a block diagram of an electrical control system for operation of the machine in the present invention.

Figures 1, 9:
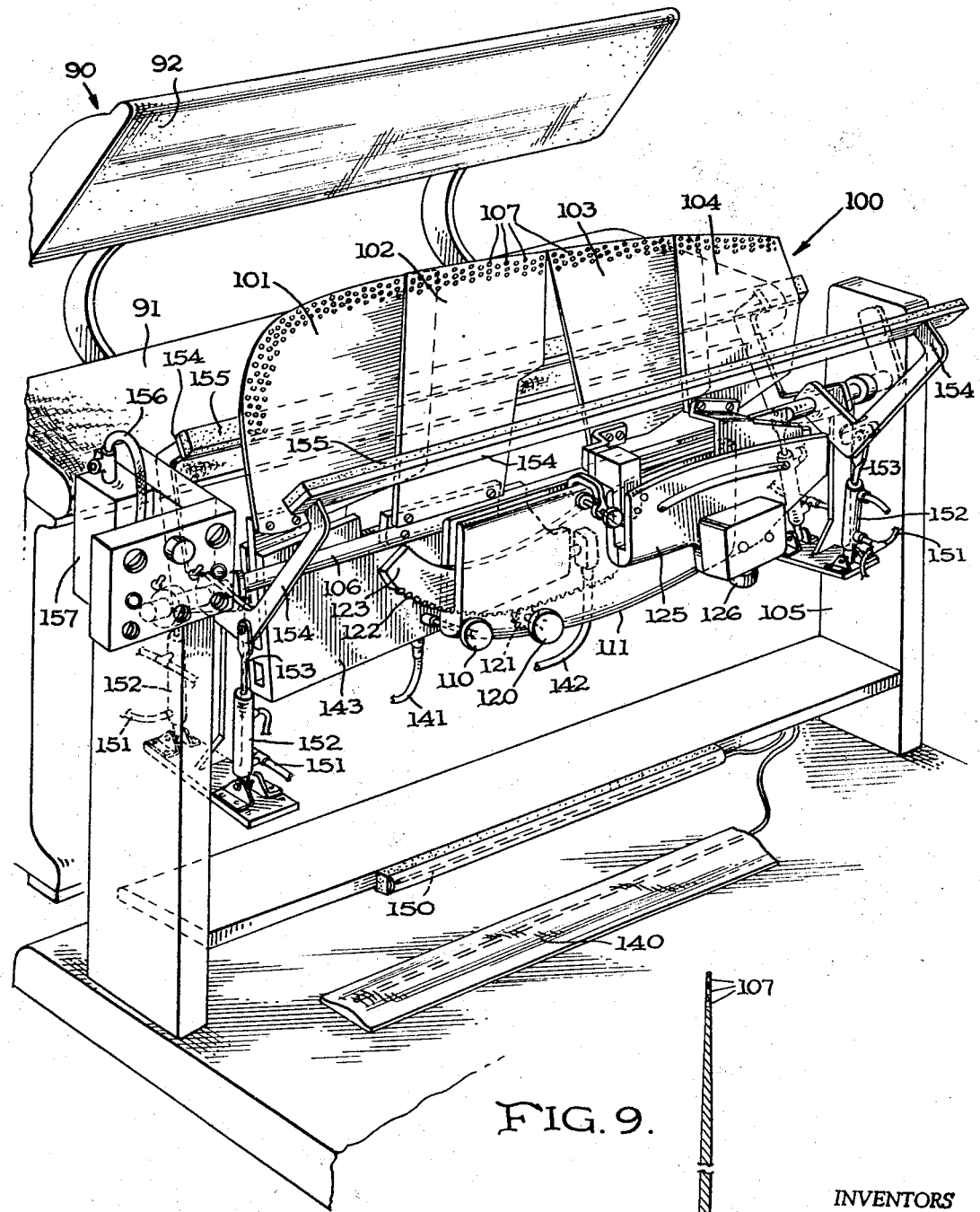
FIG. 1 is an overall perspective view of an embodiment of a machine illustrating a means of practicing the method of the present invention.
FIG. 9 is a typical cross section through a plate of the machine in previous figures.

In FIG. 1 there is shown in a perspective view an embodiment of a machine that may be used to carry out the method of shaping and pressing the edge of a coat front from the lapel to the bottom of the coat front. In FIGS. 2 and 3 are shown a left coat front 30 showing outside and inside views, respectively. It consists during the pressing operation of four major pieces. These are: a coat front 31, an interlining (not shown) possibly of canvas-like material, a lining 33, and a facing 34, the facing 34 and front 31 usually being of the same material. In these figures and at this point in the process, the collar, sleeves, and back have not been attached.

For a better understanding of the shaping and pressing of coat fronts, in regard to this invention, the following definitions are given for the terms used in the specification:

A coat front 30 is composed of the cloth which makes the front 31 of a coat. A complete coat requires right and left fronts.

The facing 34 is a piece of cloth which, in the finished coat, forms part of the lining of a coat, and the visible part of the lapel 36.

The lining 33 is a silk-like material which is used to line or partially line the inside of a coat.

The lapel 36 is that part of a coat which is turned or folded outward, exposing the facing 34.

The break point 37 of a coat is the point at which the turning of the lapel begins.

The seam 39 on a coat front is the sewing line at which the front, facing, and inter-lining are joined.

FIGS. 4 and 5 which are partial cross-section views, along lines 4—4 and 5—5, respectively, illustrate the proper relationship between the front 31, facing 34 and seams 39 upon the completion of the pressing operation. FIG. 4 applies from the break point 37 to the top of the lapel 36 and FIG. 5 applies from the break point 37 down and around the bottom curve and the bottom 38 of thes coat front. It should be noted that the general purpose of these relationships is that in the finished garment the seam 39 is not visible. The cross-hatched areas 40 indicate the approximate areas which are pressed by the machine during the process of the present invention.

The machine to accomplish the purpose of the present invention must be adjustable to accommodate the different shapes of a coat front which change with size and with style. The length of the lapel 36 (distance from break point 37 to top) varies considerably with style, and within a given style with the size. The length of a coat front from the break point 37 to the bottom of the coat varies along with the lapel. There is also considerable variation in the length from the break point 37 to the bottom. The extent of these variations is shown in FIG. 6 by means of full lines and dashed lines showing such variations. Also shown is another parameter which changes with size and style. This is the "swing." It is shown in FIG. 6 as angle α and may vary as shown by angle α'. The machine may change the angle α by pivoting the lapel 36 about the break point 37 instead of rotating the bottom 38. In FIG. 6 the bottom 38 is shown as swinging to demonstrate better the effect on the coat front 30. But pivoting of the lapel 36 is done during the pressing process for convenience and to better control how much of the front is pressed.

The front edge pressing machine of which an embodiment is shown in FIG. 1 is a manually loaded automatic machine. The machine illustrated in overall views of FIGS. 1 and 13 and in detailed FIGURES 7, 8, 9, 10, 14, 15, 16 and 17 is composed of a commercial pressing machine 90 with the remainder of the machine 100 an attachment thereto. Even a manually operated press may be modified to make it operate pneumatically and automatically in conjunction with the machine 100 and, in fact, any press may be used, provided it has a large enough pressing area.

In the machine the stand 105 is a structural member which supports a rod or main shaft 106 on which is mounted an adjustable sheet metal form comprising sheet metal plates 101 through 104. These sheet metal plates 101 through 104 are substantially vertical during loading and unloading, rotating to the horizontal position when in the press 90.

The sheet metal plates 101 through 104 are shown in greater detail in FIGS. 7, 8 and 9. FIGS. 7 and 8 show views from opposite sides of the plates. FIG. 9 shows a typical cross section through the plates, showing them to be thicker at their bases and narrowing toward their upper edges. For more economical construction it is possible, as an alternative, to use a thicker plate as the base with thin plates mounted to form the upper and side edges thereof. The sheet metal form formed by these plates 101 through 104 is adjustable to fit a large variety of styles and a complete range of sizes within those styles.

In order to proceed with the forming of a coat front, such as that shown in different views of FIGS. 2 through 5, the coat front 30 must be draped over the sheet metal plates 101-104 of the machine 100 shown in FIG. 1 in such a manner that the seam 39 lies just off the top edge of the metal plates so that the break point 37 is at the point between plates 102 and 103 and at this point the seam 39 shifts from one side of the metal plates 101-102 to the other side of plates 103-104 just below the top edges. In accordance with the shape of the plates shown in FIG. 1 and FIGS. 7 and 8, the top 36 of the coat front 30 will be fitted over the side edge of plate 104 and the bottom 38 of the coat front will extend around the side edge of plate 101. FIGS. 4 and 5 show the coat front 31 and facing 34 attached at the seam 39 and the placement of the seam 39 on different sides of the break point 37 of the coat front 30.

Either before or after placing the coat front over the metal plates as just described, but before the pressing operation, the machine must be set either to receive right or left coat fronts. In order to make this setting, metal plates 103 and 104 must be offset from the longitudinal axis of metal plates 101 and 102, as shown in FIGS. 10 through 12. FIG. 11 shows the setting relationship of the lapel plates 103, 104 and bottom plates 101, 102 for the pressing of a left coat front while FIG. 12 shows the setting of these same plates for the pressing of a right coat front. A top plan view shown in FIG. 10 also shows the offset position with lapel plates 103, 104 shown in full lines for the setting for a right coat front as in FIG. 12 and in dashed lines for receiving a left coat front as in FIG. 11. The adjusting to the two offset positions is made by the turning of the knob control 110 which moves the arcuate channel 111 shown in full and dashed line positions in FIG. 15, which is pivotally mounted to the main shaft 106 by pivotal mountings 112 and 113 connected to main shaft 106 and to arcuate channel 111 so as to pivot this channel 111 on the pivotal mountings 112 and 113 around pivot points 114.

Another adjustment to be made on the plates before pressing is dependent upon the style and is the adjustment for the swing which, as discussed previously, is determined by the angle α at the break point 37 between the lapel 36 and bottom portion 38. A control knob 120 mounted near the previously mentioned control knob 110 and on the same arcuate channel 111 controls the setting of the angle by which plates 103 and 104 are pivoted in approximately a vertical plane. This movement of these plates is operated through the turning of control knob 120 which in turn turns a gear 121, which engages the teeth 122 on the bottom of an arcuate slide section 123 riding in the arcuate channel 111. In order to allow pivoting of plates 103–104 from a position such as shown in FIG. 1 to the position shown in FIGS. 7 and 8 and also allow for a form of continuity at the break point 137, the arcuate slide section 123 has, as the name implies, its teeth 122 mounted along a sector of an arc and is attached to the plates 103–104 so as to move the whole swing slide assembly 109 in a pivotal motion through an arc in the vertical plane.

An additional control knob 126 operates through worm 127 and spur gear arrangements 128 to move plate 104 in relation to plate 103 but in such a manner so as to keep the top edges of plates 103 and 104 in a smooth, continuous line as shown in FIGS. 7 and 8. This is accomplished by again using a sector of an arc, slide member 129, with teeth 131 mounted thereon engaging the gearing 127–128 connected to control knob 126. Differing from the arcuate slide section 123 which has its teeth 122 pointing outward on an arcuate sector, slide member 129 has its teeth 131 pointing inward on an arcuate section. The top edges of plates 103 and 104 form a circular arc segment and with the toothed sector of an arc are designed so that movable plate 104 rotates about a theoretical center below the assembly, thereby allowing expansion and contraction of the form while maintaining a smooth continuity along top edges 103–104.

Having made adjustments of the metal plates for use of the machine with a left or right coat front and having adjusted for the swing and the length of the lapels, the foot operated switch 140 is operated in order to activate a solenoid valve which, through hydraulic lines 141–142 operates a hydraulic piston in a cylinder (not shown) located between the connections of the hydraulic lines 141–142 to the channel 143 within which is located rack 144 connected to the end of the hydraulic piston Reciprocal motion of rack 144 turns the spur gear 145 engaged therewith, which in turn moves the toothed arc segment 146 having its teeth engaging the spur gear 145 within the channel 143 with the upper portion of the segment having a surface 147 riding on arced surface 148 of the channel 143. This causes metal plate 101 to reciprocate toward and away from plate 102 but due to the curvature of the top of plates 101 and 102 and their relation to the curvature of the curved surface portion 148 on the channel 143, there is always a smooth line connection of the edges of plates 101 and 102 between the extremes of movement of plate 101 in relation to plate 102, because of the actual rotation of movable plate 101 about a theoretical center during expansion and contraction. Linear expansion-contraction of metal plates 101–102 rather than along a curve may be used to accommodate straight line fronts on coats. The curvature would then be considered to be of infinite radius.

When the foot switch 140 is operated, a solenoid valve is operated so as to put fluid through hydraulic line 142 to move the piston so as to move the rack 144 out of the channel 143, causing the spur gear 145 to rotate and move the toothed arc segment 146 and the attached metal plate 101 in a closing movement with plate 102, thereby facilitating the placement of the coat front over the metal plate 101–104. As soon as the foot is taken off the foot switch 140, the solenoid valve is operated so as to put fluid through hydraulic line 141 and move the rack in the opposite direction, thereby causing metal plate 101 to move in a direction away from plate 102. This causes the plates 101–104 to tend to extend to fill in the coat front 30 placed thereover and thereby draws the coat front 30 into a taut position so that it can be smoothly pressed.

The operator at this point in the process adjusts the coat front 30 over the metal plates 101–104 attempting to place the seam 39 just below the top edges of plates 101–104 with the seam 39 on one side of the lapel plates 103–104 and on the other side of bottom plates 101–102. At the same time the operator can operate the knee operated switch 150 which, through a stepping switch and a relay connected thereto actuates a solenoid valve connected in the pneumatic system, sending fluid to the hoses 151 connected to the lower portions of the air cylinders, 152. Through linkage 153, clamps 154, with a soft surface portion 155 attached thereon, are closed against the metal plates as shown in FIG. 13, holding the coat front 30 tight against the metal plates 101–104 and maintaining its position over the metal plates 101–104. At this point, the operator may make further adjustments of the placement of the seam 39 in relation to metal plates 101–104. A second activation of the knee operated switch 150, through a stepping switch and relay connected thereto, activates the operation of a solenoid valve, in the hydraulic line 156 to rotary hydraulic cylinder, of a usual commercial type, in casing 157 which causes a rotation of the main shaft 106 so as to turn the plate and clamp assembly through a rotation of a quarter of a turn into a horizontal position on the presser 90, as shown in dashed lines in FIG. 13. Since the main shaft 106 is located just above presser surface 91, the plates 101–104 with coat front 30 thereon will just rest upon surface 91 when in the horizontal position. Upper surface 92 can then be lowered by automatic controls and pressing of the coat edges will take place, facilitated by steam passing through perforations 107 along the thin edge portions of the plates 101–104.

The presser 90 then opens and main shaft 106 rotates the metal plates 101–104 back to a vertical position. The clamps 154 are then opened by the air cylinders 152 receiving air pressure through upper air lines 158 and the operator may remove the coat front which has been pressed along the seam.

The automatic steps which the machine was programmed to take upon operation of the knee switch 150 can take place through a control system such as that indicated in the block diagram of FIG. 18. The first operation of the knee switch 150 which closes the clamps 154 causes an operation of the stepping switch which moves a wiper arm on the control banks closing a connection to a relay operating a solenoid valve which then directs the air pressure to the lower portion of the air cylinders 152. The next operation of the knee switch 150 causes the coil of the stepping switch to move the wiper to the next position which again closes a connection so as to operate a relay which in turn operates a solenoid valve controlling hydraulic fluid to a rotary hydraulic cylinder in casing 157, which rotates the main shaft 106, thereby moving the metal plates 101–104 into a horizontal position. When the metal plates 101–104 reach the horizontal position, an arm 160 mounted upon the main shaft 106 which rotates therewith will be so positioned (see FIG. 13) that in the dashed position it contacts a microswitch 161, indicating completion of the rotation and thereby operating the stepping switch to move the wiper arm to its next position which operates the presser 90 either through hydraulic or electrical means to close it and indicate completion of this action whereby the stepping switch then operates a valve enabling steam to enter presser 90. The stepping switch then continues moving the wiper arm to shut off the steam and to open the press as individual switches indicate the completion of each action. Further action of the stepping switch then operates the solenoid valve so as to hydraulically rotate the main shaft to place the metal plates 101–104 back into a vertical position with the final step of the stepping switch allowing pressure to enter the upper portions of the air cylinders 152 in order to open the clamps 154.

The last step is the operation of a reset switch which places the machine in condition for recycling. The control system of FIG. 18 is merely one of many possible embodiments for connection of the electrical controls operating such a machine as that of the present invention. It is merely a conventional sequential control electrical system mainly concerned with a stepping switch which controls relays which in turn control the solenoid valves. In general, the stepping switch is controlled by the operator through an operator control switch and by switches which signal the completion of a mechanical motion in the machine.

It should be noted that the clamps 154 of the present machine are operated pneumatically in the embodiment shown. Although it is not necessary that they be operated pneumatically instead of hydraulically, it was preferred in this particular embodiment to have pneumatic operation rather than hydraulic in order to reduce the number of hydraulic lines and therefore reduce the risk of a hydraulic leak. The solenoid valves which control the pneumatic cylinders 152 are operated by the control system as discussed above.

In general, the present invention deals with the method of pressing the seams on coat fronts, which method has been performed in the present embodiment illustrated by a particular machine. This method involves the steps of placing a coat front over a thin sheet metal form which is adjustable to the size and style of the coat front and then the placing of this metal form with the coat front fitted thereon so that the seam is just below the edges of the metal adjustable form facing on opposite sides of the form for lapel and bottom sections of the form, and placing this form within a presser, preferably a steam presser, and then removing the form and the coat front from the presser and the coat front from the form and thereby eliminating the use of edge basting before pressing of the coat front.

Therefore, it will be obvious to those skilled in the art that various changes may be made without departing from the scope of the invention and the said invention is not to be considered limited to what is shown in the drawings and described in the specification.

What is claimed is:

1. A method of pressing a coat front along the seam connecting the front, facing, and interlining during the process of manufacturing a coat which comprises placing the coat front over a form having a thin edge and having a portion of the form with its edge offset from the edge of the remaining adjacent portion, aligning the seam of the coat front just below the thin edge on one side of the form over one portion of the form and just below the thin edge on the other side of the form over the remaining portion of the form, placing the form with the coat front thereon into a presser, and pressing the coat front at least along its seam.

2. The method of claim 1, which further comprises adjusting the form to fit the size of the coat front, and clamping the coat front to the form below the part being pressed before placing said form with the coat front thereon into a presser.

3. The method of claim 1, which further comprises adjusting the form for the swing angle of the coat front by adjusting the angle of the thin edge of one of said portions of said form in relation to the thin edge of the remaining adjacent portion at a break along the substantially continuous edges where the edges are offset from each other, and adjusting the form for the size of the coat front before the step of placing the form and coat front thereon into a presser.

4. The method of claim 3 which further comprises offsetting the edges of said portions of said form in relation to each other to either side as required to accommodate the side of the coat front being pressed.

5. A machine for pressing a coat front along the seam connecting the front, facing, and interlining during the process of manufacturing a coat comprising pressing means;

an adjustable form adjustable to fit within the coat front and in operative attachment to said pressing means including a plurality of plate means having thin edge portions, at least one of said plate means being an end plate movable along a plane parallel to the plane of an adjacent one of said plate means in overlapping relation to said adjacent one of said plate means, and a main shaft operatively supporting said plurality of plate means.

6. The machine of claim 5 further characterized by a pair of said plate means pivotally mounted to pivot along a member located at their ends away from said thin edge portions and in a plane parallel to the plane of their plate surfaces.

7. The machine of claim 5 further characterized by a pair of said plate means pivotally mounted and attached to said main shaft to pivot about the longitudinal axes of said main shaft.

8. The machine of claim 5 further characterized by a pair of said plate means pivotally mounted to pivot through an arc and in the plane of their plate surfaces, and pivotally mounted to said main shaft to pivot about said main shaft.

9. The machine of claim 5 further characterized by a pair of said plate means pivotally mounted to pivot through an arc in the plane of their plate surfaces, a pair of said plate means pivotally mounted to said main shaft to pivot about said main shaft, clamping means located to clamp against opposite surfaces of said plate means, means to move said clamping means into position against said plate means and away from said plate means, and means to rotate said main shaft and said plate means and clamping means to place thin edge portions in operative engagement with said pressing means.

10. The machine of claim 9 further characterized by said means to move said clamping means including pneumatic means controlled through electrical means, and said means to rotate said main shaft including hydraulic means controlled through electrical means.

11. The machine of claim 5 further characterized by means to move said at least one end plate into overlapping relation to said adjacent one of said plate means including a hydraulically operated rack of a rack and pinion arrangement, and electrical means controlling the hydraulic operation.

12. The machine of claim 5 further characterized by said plate means formed of sheet metal and having perforations through their said thin edge portions.

References Cited

UNITED STATES PATENTS

| | | | |
|---|---|---|---|
| 2,525,111 | 10/1950 | Astphan | 38—21 X |
| 2,994,978 | 8/1961 | Skovira | 38—17 X |
| 3,112,847 | 12/1963 | Bramby | 38—5 X |
| 3,305,956 | 2/1967 | Fleischer | 38—16 |

PATRICK D. LAWSON, *Primary Examiner.*

G. V. LARKIN, *Assistant Examiner.*